United States Patent [19]

Denayrolles et al.

[11] Patent Number: 4,955,979
[45] Date of Patent: Sep. 11, 1990

[54] OPTICAL PYROMETER WITH AT LEAST ONE FIBRE

[75] Inventors: Yves Denayrolles, Le Vesinet; Robert E. Pillon, Le Havre, both of France

[73] Assignee: Electricite De France - Service National, Paris, France

[21] Appl. No.: 359,303

[22] Filed: May 31, 1989

[30] Foreign Application Priority Data

Jun. 1, 1988 [FR] France .................. 88 07308

[51] Int. Cl.$^5$ ........................ G01J 5/26; G01J 5/54
[52] U.S. Cl. .................... 374/131; 250/351; 351/48; 374/124; 374/129
[58] Field of Search ............ 374/131, 112, 124, 130, 374/129; 250/338.1, 351; 356/48, 46

[56] References Cited

U.S. PATENT DOCUMENTS

| | | | |
|---|---|---|---|
| 2,131,328 | 9/1938 | Michelssen | 250/338.1 |
| 2,978,589 | 4/1961 | Howell | 374/112 X |
| 3,461,284 | 8/1969 | Joy | 374/132 X |
| 3,611,806 | 10/1971 | Hishikari | 374/129 X |
| 3,981,707 | 9/1976 | Araujo et al. | 350/96.34 X |
| 3,998,549 | 12/1976 | Pusch et al. | 374/129 |
| 4,652,143 | 3/1987 | Wickersheim et al. | 250/351 X |
| 4,659,043 | 4/1987 | Gallagher | 340/584 X |
| 4,767,219 | 8/1988 | Bibby | 374/131 X |
| 4,794,619 | 12/1988 | Treyay | 374/131 |
| 4,883,354 | 11/1989 | Sun et al. | 356/72 X |

FOREIGN PATENT DOCUMENTS 2080953 11/1971 France .

OTHER PUBLICATIONS

"Temperature Measurement with a Zirconium Fluoride Glass Fiber", Applied Optics, vol. 26, No. 4, 2/15/87, pp. 607-609, S. R. Mordon et al.

Primary Examiner—Daniel M. Yasich
Attorney, Agent, or Firm—Sughrue, Mion, Zinn, Macpeak & Seas

[57] ABSTRACT

The pyrometer includes at least one optical fibre (10) transparent to infra-red made of fluorite glass, a reference emitter (20) of infra-red flux, an infra-red detector (30) for receiving the infra-red flux emerging from the optical fibre (10) or the infra-red flux originating from the reference emitter (20), a mechanical modulator (40) for infra-red flux positioned, in the direction of flux propagation, upstream of the infra-red detector (30) for periodically and successively interrupting the infra-red fluxes emerging from the optical fibre (10) and originating from the reference emitter (20), an electronic means of demodulation (50) for receiving the output signal from the detector (30) and a servo-control signal emitted by the mechanical modulator (40) in order to ensure a synchronized measurement, and a measuring apparatus (60) connected to the electronic demodulation means (50) for indicating the temperature to be measured of the target irradiating the optical fiber.

7 Claims, 5 Drawing Sheets

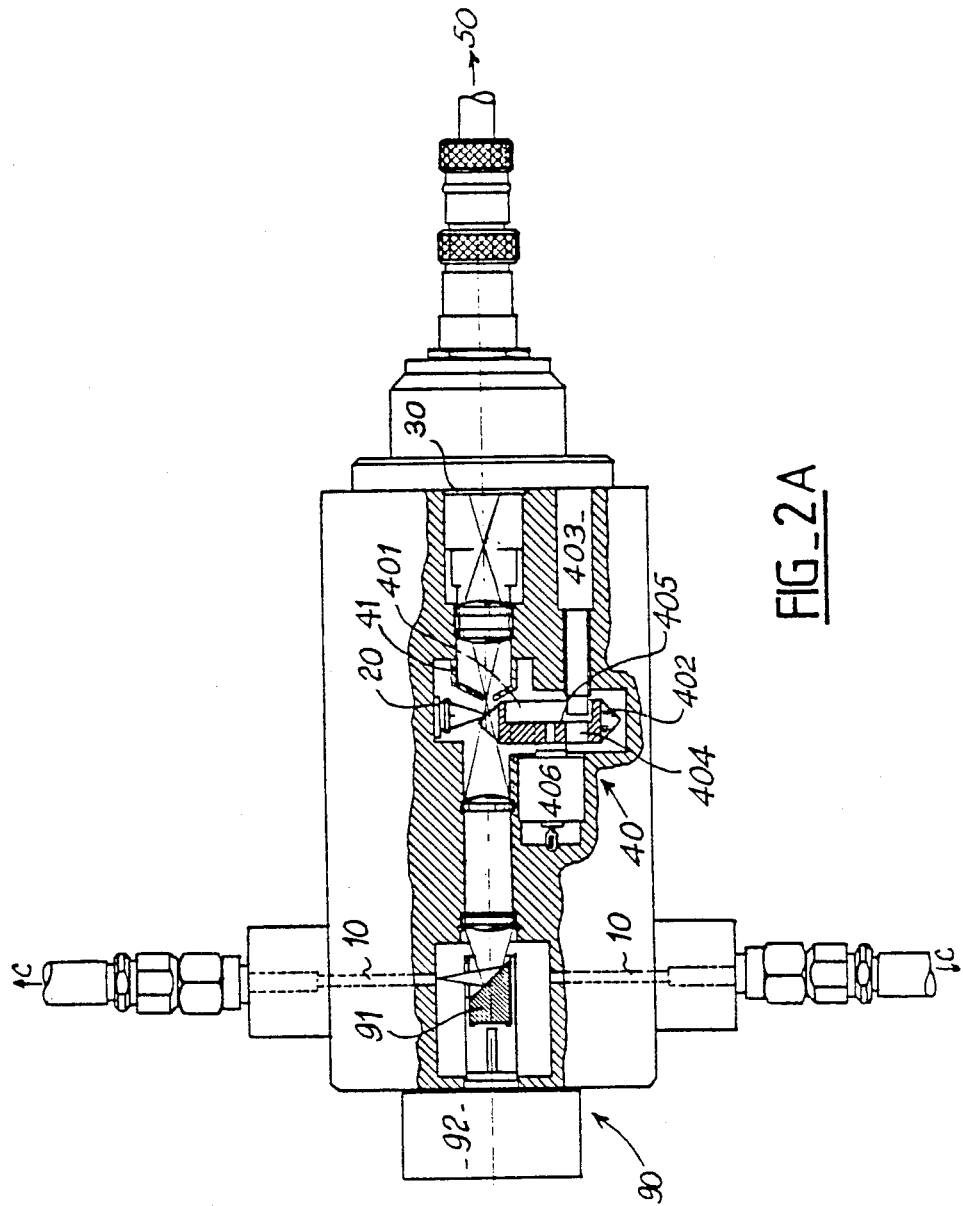
FIG_2A

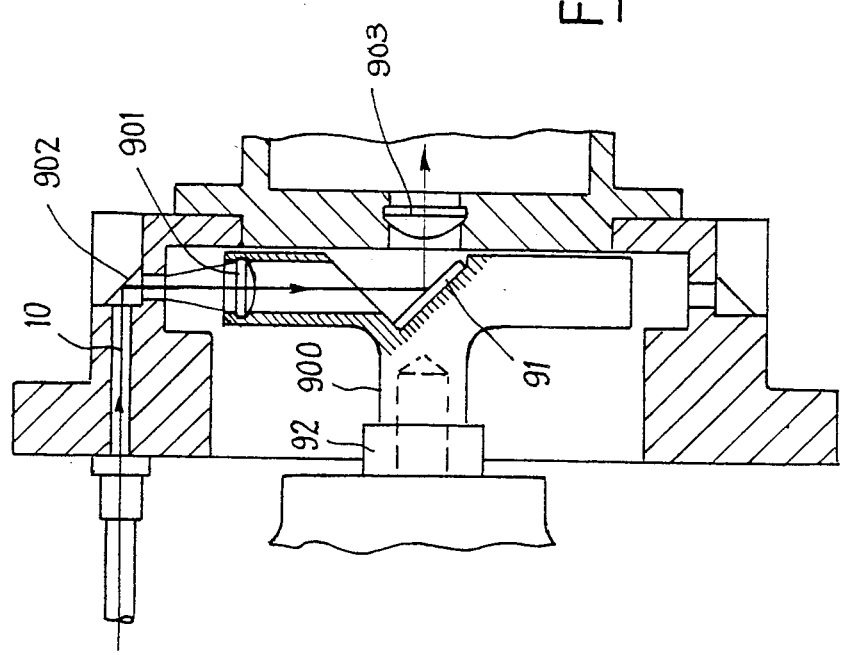

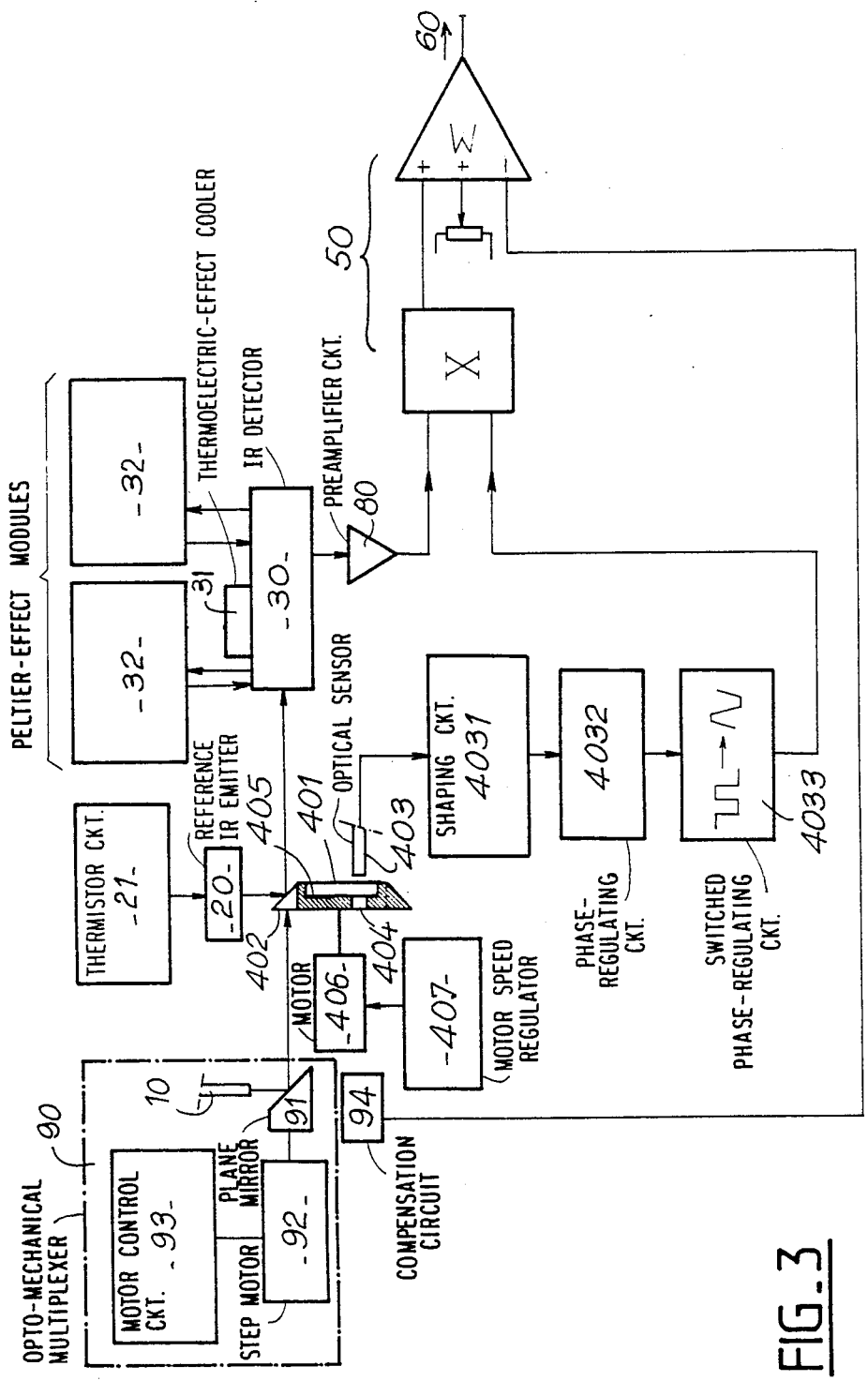
FIG._3

OPTICAL PYROMETER WITH AT LEAST ONE FIBRE

BACKGROUND OF THE INVENTION

The invention relates to the measurement of relatively low temperatures, for example between 30° C. and 500° C., and more particularly the measurement of temperatures in areas which are difficult to reach or dangerous and where the environment is disrupted (lack of visibility, ambient temperature, local pressure, vibrations, existence of electro-magnetic fields, presence of ionizing radiation . . . ), for targets such as elements or objects out of reach, that is which are moving, or under high electric tension.

The invention relates more particularly to an optical pyrometer with optical fibres.

At present, it is normal to use, for temperature measurement, thermocouples or contact probes, optical pyrometers, and silica optical-fibre pyrometers.

All these solutions present inconveniences.

Thermocouples and contact probes require intimate physical thermal contact with the target of which it is desired to measure the temperature. Also, these types of thermocouples and probes are sensitive to electro-magnetic parasites and their response time is relatively long.

Optical pyrometers require direct vision of the target of which it is desired to measure the temperature and also that the optical path followed by the flux is transparent in the infra-red wavelength band where the main emission for the range of temperatures concerned is situated. It is therefore necessary to use special optical windows in the enclosures or intermediate walls.

Silica optical-fibre pyrometers are themselves not sensitive to temperatures lower than about 500° C. This is due to the fact that fibres made with this substance have a transmission coefficient which is very inadequate in the infra-red.

SUMMARY OF THE INVENTION

The invention aims to remedy most of the inconveniences presented by the techniques of today which have just been mentioned briefly.

The invention relates to an optical pyrometer for the measurement of relatively low temperatures which uses at least one optical fibre transparent in the infra-red.

The subject of the invention is an optical pyrometer with an optical fibre for measuring relatively low temperatures of targets, characterized in that it includes at least one optical fibre transparent in the infra-red made of fluorite glass associated with a target, a reference emitter of infra-red flux, an infra-red detector for receiving the infra-red flux emerging from the fibre or the infra-red flux originating from the reference emitter, a mechanical modulator for infra-red flux positioned, in the direction of flux propagation, upstream of the infra-red detector for periodically and successively interrupting the infra-red fluxes emerging from the fibre and originating from the reference emitter, an electronic demodulation means for receiving the output signal from the detector and a servo-control signal emitted by the mechanical modulator in order to ensure a synchronized measurement, and a measuring apparatus connected to the electronic demodulation means for indicating the temperature of the target to be measured.

Thanks to the optical pyrometer according to the invention, it is possible to obtain a stable output signal for target temperatures which are even of the order of about 30° C. In order to achieve this, a synchronized detection is of the signal by mechanical modulation of the infra-red flux emitted by the optical fibre, and demodulation is ensured using suitable electronic circuits of the electronic demodulation means; a stabilization of the reference signal sent to the infra-red detector is obtained using an internal regulated reference emitter of infra-red flux and making use of a mechanical modulator which reflects the infra-red flux originating from the reference emitter towards the detector, while it interrupts the infra-red flux emerging from the optical fibre.

Furthermore, in order to avoid the drift of the infra-red flux emerging from the optical fibre, a compensation is ensured by measuring the temperature in the vicinity of its exit and by generating a correction signal from it. As a result, the influence of the thermal flux surrounding the exit of the optical fibre, which is inevitably superimposed on the infra-red flux which it transmits, is reduced.

In addition, it will be observed that if several optical fibres are used and an opto-mechanical multiplexer is attached to them, it is possible to measure temperatures belonging to several targets by still using the same final system of detection made up of the infra-red detector, the reference emitter as well as the mechanical modulator of infra-red flux.

Other characteristics of the invention will appear on reading the description and claims which follow and on examining the attached drawings, given only by way of example, in which:

BRIEF DESCRIPTION OF THE DRAWINGS

FIG. 2A is a detailed view, part sectioned, of an embodiment of construction of a pyrometer according to the invention with opto-mechanical multiplexer;

FIG. 2B is a partial view similar to that of FIG. 2A of an embodiment variation;

FIG. 3 is a synoptic diagram of the functional links of a pyrometer according to the invention;

DETAILED DESCRIPTION OF PREFERRED EMBODIMENTS

Figure 1:
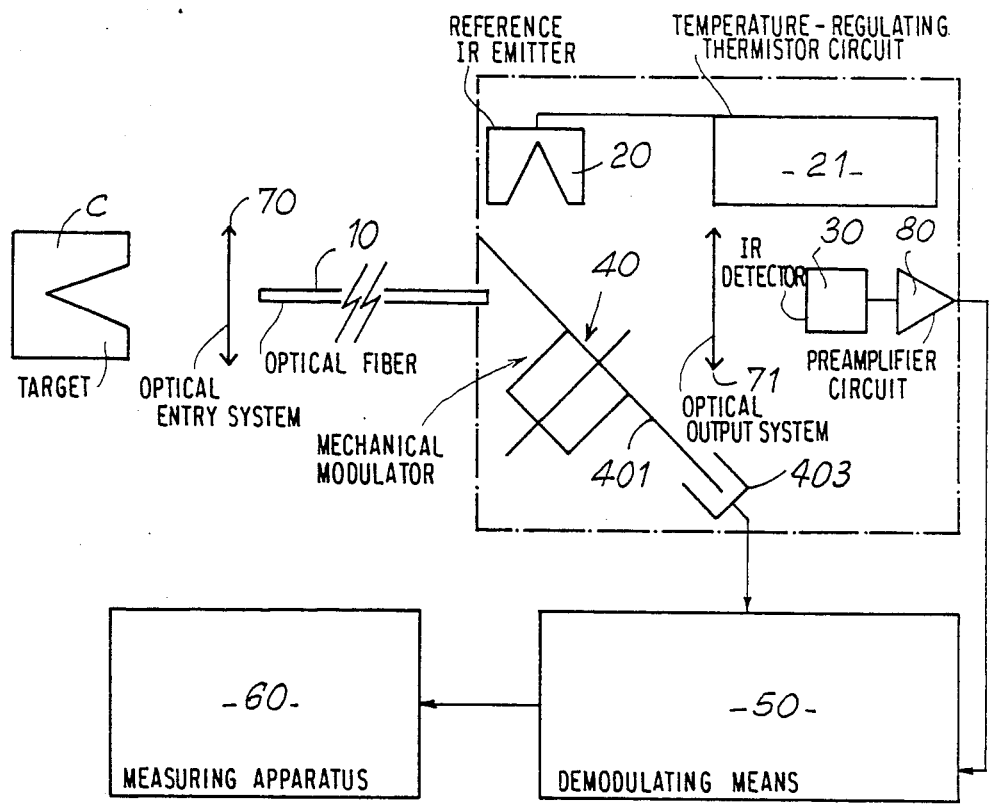
FIG. 1 is a diagram of an embodiment of a pyrometer according to the invention.

The measurement of temperatures using optical pyrometers and the use of optical fibres being well known in the art, there will be described, in the description which follows, only what relates to the invention. For further information, the person skilled in the art under consideration will draw from current standard solutions at his disposal in order to meet the particular problems with which he is confronted.

In what follows the same reference number will always be used to designate the same element whatever the particular embodiment.

As can be seen from examining the various Figures of the attached drawings, an optical pyrometer with at least one optical fibre for measuring relatively low temperatures of targets C, according to the invention, includes at least one optical fibre 10, a reference emitter 20 of infra-red flux, a detector 30 sensitive to infra-red for receiving the infra-red flux emerging from the fibre 10 or the infrared flux originating from the reference emitter 20, a mechanical modulator 40 for infra-red flux positioned, in the direction of flux propagation, upstream of the infra-red detector 30 for periodically and successively interrupting the infra-red fluxes emerging from the fibre 10 and originating from the reference emitter 20, an electronic demodulation means 50 for receiving the output signal of the detector 30 and a servo-control signal emitted by the mechanical modulator 40 in order to ensure a synchronized measurement, and a measuring apparatus 60 connected to the electronic demodulation means 50 for indicating the temperature to be measured a target C.

This pyrometer also includes, if necessary, adapted to the optical fibre 10, an optical entry system 70 and an optical output system 71 respectively, on the one hand for collecting an infra-red flux emitted by the target C of which it is desired to measure the temperature and directing it to the optical fibre 10, and on the other hand for assembling the flux which emerges from the latter, after having gone through it, and sending it to the infra-red detector 30.

This optical pyrometer also includes electronic circuits 80 and, if necessary, an opto-mechanical multiplexer 90 (see FIGS. 2A, 2B and 3).

Each of these constituents will be returned to so that their structure and function can be described in detail.

The optical fibre 10 is a fibre of fluorite glass, transparent from the visible range to the infra-red extending to about 5 microns.

This fibre, which preferably has a total outer diameter of the order of 0.450 mm, is made up of a core, 0.200 mm in diameter, surrounded by a sheath 0.025 mm thick and a protective polymer covering. This fibre, in addition to the polymer sheath for example of PVC, is protected by a metal spiral of stainless steel, when environmental conditions permit this.

This fibre can be bent to radii which should not be less than 50 mm.

The optical fibre used has a numeric aperture of 0.2 and a spectral attenuation of about 1 db per meter between one and four microns of wavelength.

For constructing the pyrometer according to the invention, an optical fibre is used which has the reference "IR guide 200/250" in the catalogue of the French company "Le Verre Fluoré".

If necessary the free ends of this fibre are inserted into commercial connectors, for example those produced by the JAEGER company under the reference SMA-US Monomode, suitably adapted.

The reference emitter 20 for infra-red flux functions like a local black body made of a blackened plate in thermal contact with a temperature-regulated thermoelectric element. This regulation of the recording point of the reference emitter, which is obtained using a circuit 21 with a thermistor, enables the temperature value to be chosen between ambient temperature and $-20°$ C. with a stability of the order of 0.1 K. In order to do this, commercial components are used as can be seen from the block diagram shown in FIG. 4 in particular.

The detector 30 of infra-red flux is for example a Pb-Se detector cooled for example by a thermoelectric-effect cooler 31, of which the output signal is pre-amplified by a circuit 80 as schematized in FIG. 1. As can be seen from FIG. 4, this circuit 80 includes a preamplifier 81 with variable gain and a rejecting filter 82 (50-100 Hz).

A component from the Hamamatsu company is used, for example, cooled to $-10°$ C., or one having the reference OTC 12 S 83T in the catalogue of the American company OPTO ELECTRONICS.

Figure 4:
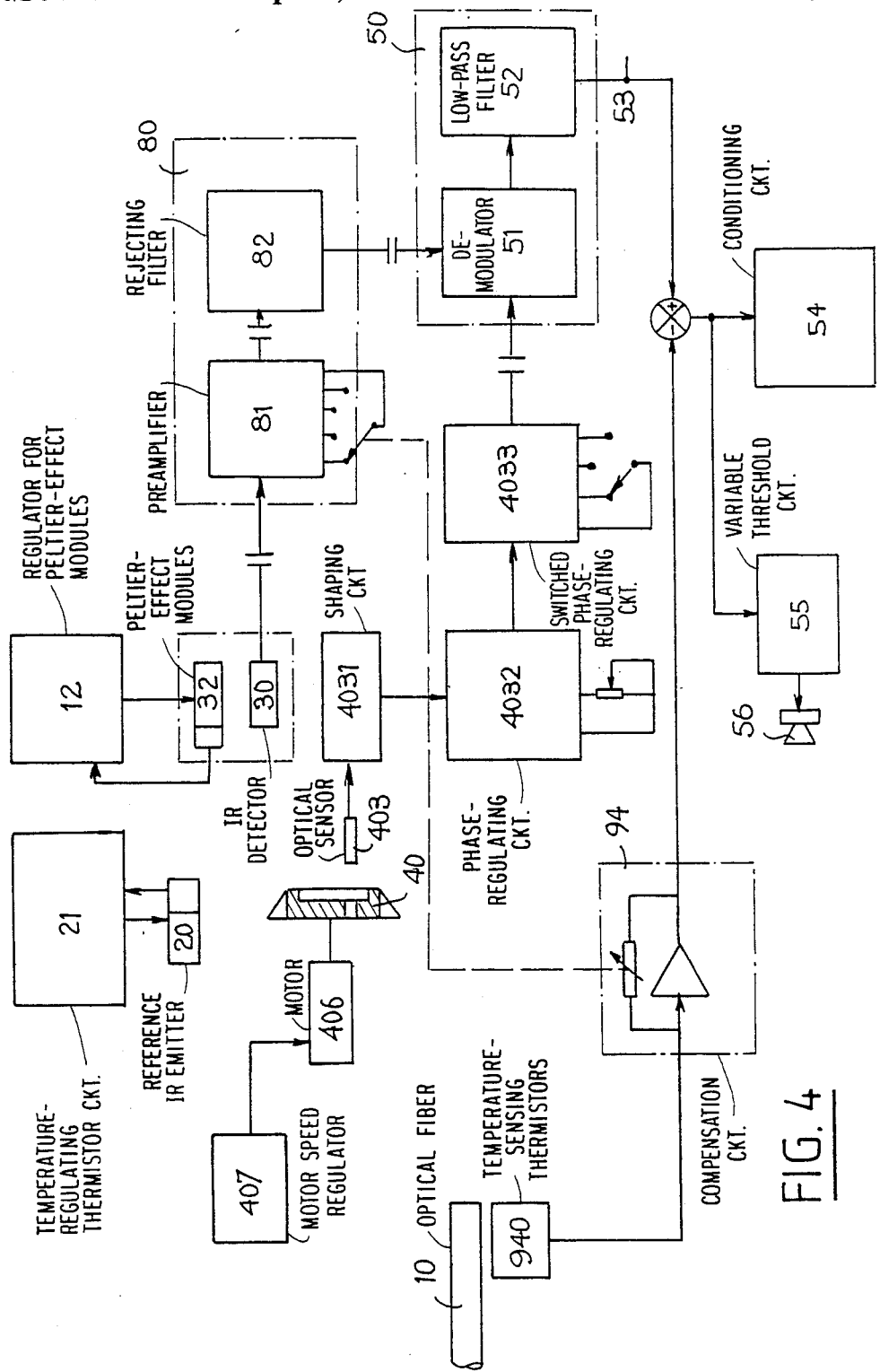
FIG. 4 is a block diagram of the electrical circuits for operating a pyrometer according to the invention.

For reasons of better temperature control this detector 30 is kept on the optical axis of the system using four Peltier-effect modules 32, only some of which are schematized in the drawing. Components are chosen, for example, which have the reference CP 1-4 11-10L in the catalogue of the American company MELCOR. A regulator 12 ensures that they function correctly, using a probe as illustrated in FIG. 4.

In order to obtain the necessary cooling of this infra-red detector a two-stage thermoelectric element is preferably used.

The mechanical modulator 40 is made up of, for example, a metal disk 401 with equal and equidistant small blades 402 turning at constant speed so as to interrupt periodically the infra-red flux emerging from the fibre 10. The small blades are, preferably, reflective and oriented as clearly drawn in FIGS. 1, 2A, 2B or FIG. 3, so as to send back a part of the flux originating from the reference emitter 20 towards the detector 30. These small blades are made reflective by direct polishing and gilding or by adding suitable mirrors.

In the embodiment of FIG. 1 a plane disk is used with an axis inclined at 45° to the optical axis as illustrated. In the embodiment of FIGS. 2A, 2B or 3 a disk with small blades bent back is used with the axis parallel to the optical axis, as illustrated.

The angular rotational speed of the disk 401 is checked using an optical reflection sensor 403 which interferes with a ring of equidistant holes 404 spaced out on the centre part 405 of the disk (see FIGS. 2A, 2B or 3). The stability of the rotational speed is ensured by an electronic regulator 407, which acts on a motor 406.

For the embodiment shown, a miniature motor 406 is used which has the reference 1212 or 1331 in the catalogue of the Swiss company MINIMOTOR SA and for the optical sensor 403 the component is used which has the reference GP 2502 in the catalogue of the SCHARP company.

For the embodiment shown, this modulator intercepts the infra-red fluxes at a frequency of the 487 Hz. Thus the detector 30 receives only a modulated flux which is the difference between that coming from the fibre and that from the reference emitter.

The output signal of the sensor 403 feeds a shaping circuit 4031 which energizes a continuous phase-regulating circuit 4032. This phase-regulating circuit 4032 feeds a switched phase-regulating circuit 4033 connected to the electronic demodulation means 50.

The optical entry system 70 is made up in practice of two off-axis parabolic mirrors, coated with a layer of rhodium. A fluorite lens is associated with the mirrors.

This optical entry system 70 is such that the mirrors have a focal distance of 19 mm and deflect the beam at 90° and the lens has a focal distance of 50 mm and is located such that its focus coincides with that of the first mirror so as to send back a parallel beam to the second mirror in order to collect, very accurately, the infra-red flux emitted by the target C on the entry face of the optical fibre 1.

Thanks to such an assembly a pyrometer is obtained of which the effective angle of field is small, of the order of 0.3°, which allows the measurement of the temperature of targets of reduced size and far away. By thus creating an enlargement of about 300, a field of about 100 mm is obtained, at about 2 meters.

The optical output system 71 is made up, as illustrated in FIGS. 2A, 2B of a carrier associated with a focusing optic on the detector 30. These optical components are plano-convex or bi-convex lenses made of sapphire or fluorite. They have for example a diameter of 10 mm and a focal length of 20 mm. A diaphragm 41 is positioned at the image focus of the carrier which lets through only the infra-red flux coming from the optical fibre and from the immediate environment of its output face. All the parasitic infra-red fluxes which could reach the detector 30 are thus to a large extent eliminated. The modulator 40 is positioned as close as possible upstream of the diaphragm 41 relative to the path of the infra-red fluxes under consideration.

Initially, in order to ensure an accurate alignment of all the optical components, it is preferable to use a helium-neon laser, the beam of which is injected into the optical fibre by its face opposite to the components 70 and 71 under consideration.

When the targets are nearer, the optical system 70 can be reduced to a single fluorite lens, of suitable focal distance, or it can even be suppressed if the target of which it is desired to measure the temperature is in the immediate vicinity.

The operational connections of the various components of the optical pyrometer with optical fibres according to the invention can be clearly seen by examining FIG. 3 in particular. From this it can be seen that the output signal of the detector 30 is sent to the electronic demodulation means 50 which also receives the servo-control signal emitted by the mechanical modulator 40 to ensure a synchronized measurement.

This electronic demodulation means 50 which includes for example a demodulator 51 and a low-pass filter 52, is connected to a measuring apparatus 60 which indicates the temperature to be measured of the target. This measuring apparatus can be a transient display or a printer, as is normal. The connection is preferably made as illustrated in detail in FIG. 4, where there are shown a test terminal 53, a conditioning circuit for the output signal 54 (for example 4–20 mA type) and a circuit with variable threshold 55 connected to an alarm 56.

The pyrometer according to the invention includes electronic circuits of which the block-diagram is shown in FIG. 4.

With the circuits adopted there is obtained a time constant adjustable up to several seconds and an output noise, the average value of which corresponds to uncertainties in the measured value of the temperature of the target of $\pm 3°$ C. for a temperature of 100° C. and $\pm 0.5°$ C. for a temperature of 200° C.

In the embodiment which has just been described a single optical fibre 10 was used together with a single target C, the temperature of which it is desired to measure.

It is clear that additional optical fibres 10 can be used, for example twenty. In such a case it suffices to attach a multiplexer 90, for example of opto-mechanical type, to the pyrometer according to the invention.

As is shown in FIGS. 2A, 2B and 3, such a multiplexer 90 is interposed between the output faces of the various optical fibres 10 arranged in a ring, only some of which are shown, and the mechanical modulator 40.

The multiplexer 90 includes for example a plane mirror 91 of elliptic section inclined at 45°, as drawn, rotationally driven by a motor 92 step by step, which explores cyclically the twenty optical fibres each connected with a particular target, not shown, the temperature of which it is desired to measure. This elliptic mirror sends successively the infra-red flux emerging from each of these optical fibres on the optical axis of the detector 30.

The motor 92 is driven by a control circuit 93.

A variant of the embodiment of the multiplexer 90 illustrated in FIG. 2B allows the optical fibres to be arranged parallel to the optical axis of the detector 30. This modified multiplexer includes a mechanical drum 900 rotationally driven by a motor 92 and fitted with a lens 901 made of sapphire or fluorite, focusing to infinity the flux originating from each fibre 10 and deflected first by a small associated prism 902 made of fluorite. The flux thus collimated is deflected by a plane mirror 91 of elliptic section to the optical axis of the detector 30 and focused by a second lens 903. The rest of the multiplexer is identical in principle to the preceding embodiment.

As already indicated, in order to minimize the influence of the environment on the flux emerging from the fibres, the surrounding surfaces are blackened and their temperature is sensed by thermistors 940, only schematized, in order to be able, if necessary, to effect temperature compensation with an electronic compensation circuit 94 associated with a preamplifier 81 for the regulation of the gain as illustrated in FIG. 4.

The servo-control can be conveniently obtained using a programmable micro-calculator.

Full advantage is taken of the optical pyrometer with special optical fibres transparent in the infra-red, according to the invention.

This pyrometer according to the invention has applications in various technical areas where it is necessary to operate in a hostile environment.

This is particularly the case for nuclear installations where the superficial temperature of certain irradiated elements must be supervised.

It is understood that when dealing with irradiated targets, it is not possible to come into contact with them and that it is even particularly inadvisable to be in direct optical view for safety reasons, so as not to be exposed to ionizing radiations.

Thanks to the pyrometer according to the invention, it is therefore possible to place the detector 30 and everything associated with it behind a protective concrete wall, the sighting being effected along an indirect sinuous path thanks to the optical fibres 10.

Full advantage is therefore taken of the optical pyrometer with optical fibres, according to the invention, for measuring relatively low temperatures where the infra-red flux emitted by a target being studied can be of the same order as that emitted spontaneously by bodies at ambient temperature.

It is Clear that the pyrometer according to the invention also allows temperature measurements of moving targets such as turning shafts, due to the absence of physical contact.

What is claimed is:

1. An optical pyrometer for measuring the temperature of a target object (C) having a temperature not greater than about 500° C. and producing IR radiations, said pyrometer comprising: at least one optical fiber (10) transparent to IR, made of fluoride glass and having an entrance end, directed toward said target object (C) and positioned to receive at least a part of the IR radiation flux produced by said target object (C), and an exit end through which said part of the IR radiation flux received by said entrance and emerges: a reference emitter (20) for emitting a reference IR flux and which is located near said optical fiber exit end;

an infra-red detector (30), sensitive to impinging IR fluxes emerging from said optical fiber exit end and emitted by said reference emitter (20), and adapted to receive said fluxes and to produce an output signal commensurate with the impinging fluxes;

a mechanical modulator (40) positioned, in the direction of propagation of said fluxes from said optical fiber exit end and from said reference emitter, upstream of said detector, and adapted to periodically and successively interrupt the IR flux, emerging from said optical fiber exit end, and the IR flux originating from said reference emitter (20), and to produce a servocontrol signal;

electronic means (50), connected to both said detector (30) and said mechanical modulator (40), to receive their respective output and servocontrol signals to ensure a synchronous detection; and a measuring apparatus (60), connected to said electronic means (50), for indicating the temperature of the target object (C) irradiating the optical fiber entrance end.

2. Pyrometer according to claim 1, wherein the mechanical modulator (40) includes a disk (401) with small rotating and reflective blades (402) interposed in the infra-red fluxes emerging from the optical fibre (10) and originating from the reference emitter (20) so as periodically to interrupt the flux emerging from the optical fiber second end and to reflect the flux originating from the reference emitter.

3. Pyrometer according to claim 1 or 2, wherein an optical entry system (70) and an optical output system (71) respectively are associated with said at least one optical fiber (10), on the one hand for collecting the infra-red flux emitted by the target object and directing it to the optical fiber entry end, and on the other hand for gathering the flux emerging from said exit end after traversing said optical fiber.

4. Pyrometer according to claim 3, wherein the mechanical modulator (40) is located between the exit end of the optical fiber (10) and the optical output system (71).

5. Pyrometer according to claim 4, wherein said small blades (402) of the modulator (40) are inclined at 45° to an optical axis of the pyrometer.

6. Pyrometer according to claim 3, wherein said optical entry system (70) includes two parabolic mirrors coated with rhodium and one fluoride lens.

7. Pyrometer according to claim 1, comprising: a plurality of optical fibers (10) so as to form a multi-way pyrometer; an opto-mechanical multiplexer (90) with a pivotally movable deflecting mirror (91) placed between said optical fibers and said mechanical modulator (40); and a stepping motor (92), connected to said mirror (91) to control its position to send successively the infra-red flux emerging from each of the optical fiber exit ends to said infra-red detector (30) through only a single optical output system (71).

* * * * *